(12) United States Patent
Kawabe et al.

(10) Patent No.: US 7,451,473 B2
(45) Date of Patent: Nov. 11, 2008

(54) VIDEO DISTRIBUTION METHOD AND VIDEO DISTRIBUTION SYSTEM

(75) Inventors: Tsuyoshi Kawabe, Tokyo (JP); Hirotada Ueda, Kokubunji (JP); Kazuhito Yaegashi, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 988 days.

(21) Appl. No.: 10/820,031

(22) Filed: Apr. 8, 2004

(65) Prior Publication Data
US 2004/0205825 A1 Oct. 14, 2004

(30) Foreign Application Priority Data
Apr. 11, 2003 (JP) .............................. 2003-107504

(51) Int. Cl.
*H04N 7/173* (2006.01)
*H04N 7/18* (2006.01)
*H04N 9/47* (2006.01)

(52) U.S. Cl. ...................... 725/108; 348/143; 348/154; 348/152; 725/112; 340/540; 340/541

(58) Field of Classification Search ................. 348/142, 348/143–160; 396/427; 340/540, 541, 506, 340/538.15, 539.11, 539.14, 539.22; 725/105
See application file for complete search history.

(56) References Cited

U.S. PATENT DOCUMENTS 4,232,347 A * 11/1980 Tachi ...................... 360/73.04
6,970,183 B1 * 11/2005 Monroe ...................... 348/143
2002/0089517 A1 * 7/2002 Ludtke et al. ............... 345/629
2002/0143938 A1 * 10/2002 Alexander et al. .......... 709/224

FOREIGN PATENT DOCUMENTS

| JP | 2000354239 | | 12/2000 |
|---|---|---|---|
| JP | 2001167365 A | * | 6/2001 |
| JP | 2002-157173 | | 5/2002 |
| JP | 2002230654 | | 8/2002 |
| JP | 200352037 | | 2/2003 |

* cited by examiner

*Primary Examiner*—Hunter B Lonsberry
*Assistant Examiner*—Robert Hance
(74) *Attorney, Agent, or Firm*—Mattingly, Stanger, Malur & Brundidge, P.C.

(57) ABSTRACT

A video distribution method and a video distribution system connected to a transmission path such as the Internet. The system has a video signal input unit, an encoder for converting the video signal into a digitally compressed image data, an image accumulation and distribution unit for accumulating and distributing the digitally compressed image data, a notification unit for reading the accumulated images and detecting an image change, an image browsing data converter for reducing the accumulated image, and an information terminal for accessing the images of the image accumulation and distribution unit and the image browsing data converter. The notification unit, upon detection of an image change, records the image change occurrence time. The information terminal acquires the image from the image accumulation and distribution unit or the video browsing data converter based on the change occurrence time information stored in the notification unit.

17 Claims, 9 Drawing Sheets

FIG. 5
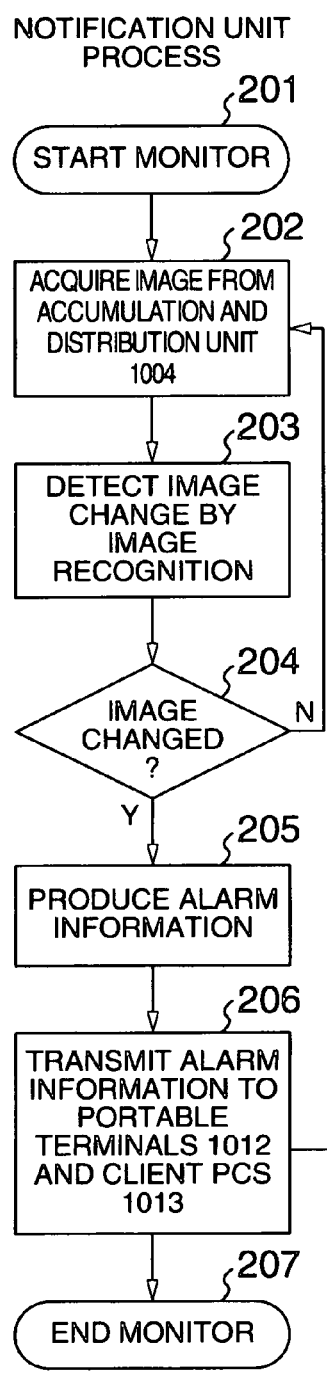
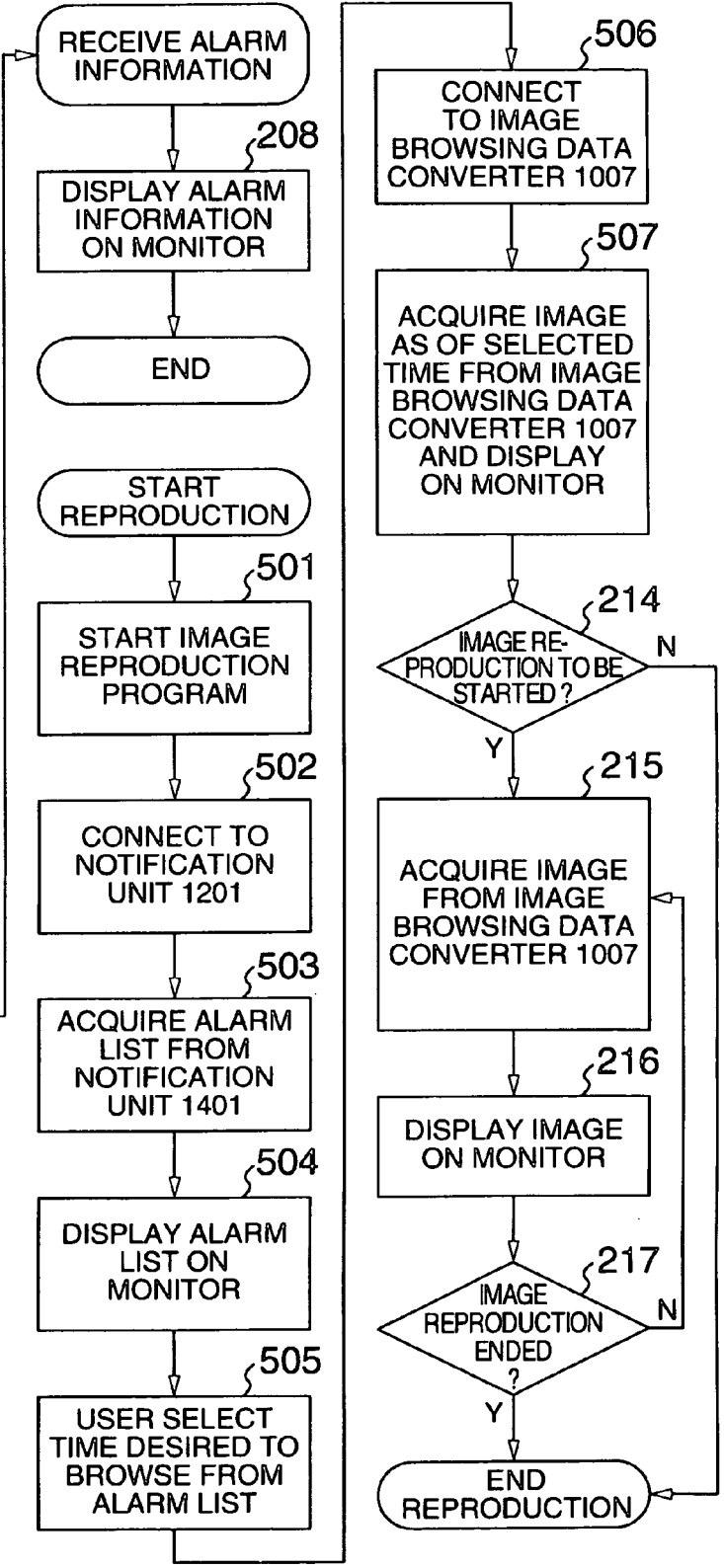

| ID No. | IMAGING DATE & TIME/CHANNEL/ COMPRESSION SCHEME |
|---|---|
| 0000000001 | 20030319101802576-1-JPG |
| 0000260005 | 20030320102003257-3-JPG |
| 00019150012 | 20030327140303257-5-JPG |

VIDEO DISTRIBUTION METHOD AND VIDEO DISTRIBUTION SYSTEM

BACKGROUND OF THE INVENTION

The present invention relates to a video distribution system and a video distribution method, and in particular to a video distribution system and a video distribution method wherein an image is distributed to at least a receiving terminal connected to the network with the change in the image detected by a network monitor system as alarm information.

In recent years, a technique for an intruder monitor system using a monitor camera has been developed in which the monitor images are accumulated and distributed using the network technique of the internet or LAN. A technique has also been developed for accumulating images as digital data in a storage unit such as a hard disk or DVD (digital versatile disk).

Nevertheless, a video distribution system which can fully meet the individual requirements of a plurality of clients connected to a transmission path such as an internet has yet to be developed. The development is also required of a video distribution system which can sufficiently process the accesses from terminals of various functions and scales such as a portable telephone, a portable information terminal (a personal digital assistant (PDA)) and a personal computer.

JP-A-2002-157173 proposes a monitor information supply method in which a monitor terminal installed in a specific area and the user corresponding to the monitor terminal are registered and a management computer links the monitor terminal and the user.

SUMMARY OF THE INVENTION

An object of this invention is to provide a video distribution method and a video distribution system capable of distributing an image in response to a request of a plurality of clients connected to a transmission path such as the Internet.

Another object of the invention is to provide a video distribution method and a video distribution system in which an image can be distributed in accordance with the request from a client terminal having a comparatively limited processing ability.

Still another object of the invention is to provide a video distribution method and a video distribution system in which an image can be reproduced (replayed or played back) in any of various reproduction modes in accordance with the request of a client.

Yet another object of the invention is to provide a video distribution method and a video distribution system in which an image as of the time of occurrence of an abnormality in a monitored area can be retrieved or fetched and provided on the monitor screen of a client terminal.

According to one aspect of the invention, there is provided a video distribution system connected to a communication network to distribute an image according to a request, comprising:

at least one image pickup unit for picking up an image of a predetermined monitor area and converting the image into a video signal;

at least one encoder connected to receive the video signal from the image pickup unit, each encoder encoding the video signal from an associated image pickup unit and sending the encoded video signal to the network;

an image accumulation and distribution unit connected to the network for accumulating the encoded video signal from a designated encoder, the image accumulation and distribution unit attaching unique information to each image frame;

a data converter connected to the network for reading the accumulated images from the image accumulation and distribution unit in accordance with a request and converting the accumulated image into a reduced image;

at least one information terminal connected by cable or radio to the network for accessing the image accumulation and distribution unit or the data converter to acquire and display the image; and a notification unit connected to the network for reading the accumulated image from the image accumulation and distribution unit, detecting an image change indicating an abnormality in the monitor area and displaying the alarm information including the time point at which the image change takes place (hereinafter referred to as change occurrence time) on an associated information terminal, wherein the information terminal accesses the image accumulation and distribution unit or the data converter in response to an operation of the associated information terminal by the user, and acquires the image within a predetermined time range related to the change occurrence time from the image accumulation and distribution unit or the data converter.

According to an embodiment, the information terminal is so configured that the alarm information including at least the image change occurrence time, an image as of the change occurrence time and a symbol allowing the user of the information terminal to select whether the image in a predetermined time range continues to be reproduced or not is displayed in the display section of the information terminal.

According to an embodiment, the information terminal displays the image within the predetermined time range in the display section together with a symbol indicating the present reproduction condition in response to the selection of the continued reproduction.

According to an embodiment, the information terminal acquires the image within the predetermined time range from the data converter and displays the image in dynamic or moving image mode in the display section of the information terminal.

According to an embodiment, the information terminal acquires the image in the predetermined time range from the data converter and displays the image, frame by frame, in the display section of the information terminal in accordance with a request of the information terminal user.

According to an embodiment, the at least one information terminal includes at least one portable terminal and at least one client PC (personal computer).

According to an embodiment, a field for allowing the user to input at least the information specifying the information terminal user and the address of the notification unit is displayed in the display section of the information terminal in response to the selection of the continued reproduction or replay.

According to an embodiment, the notification unit is so configured that the unique information is stored in a list in association with the corresponding serial number of the image frame each time of image change detection, wherein the list is displayed in the display section of the information terminal in such a way as to permit selection of arbitrary unique information in response to the input of the user specifying information and the address of the notification unit.

Other objects, features and advantages of the invention will become apparent from the following description of the embodiments of the invention taken in conjunction with the accompanying drawings.

BRIEF DESCRIPTION OF THE DRAWINGS

FIG. 5 is a flowchart for explaining a video distribution method according to another embodiment of the invention.

DESCRIPTION OF THE EMBODIMENTS

Figure 1:
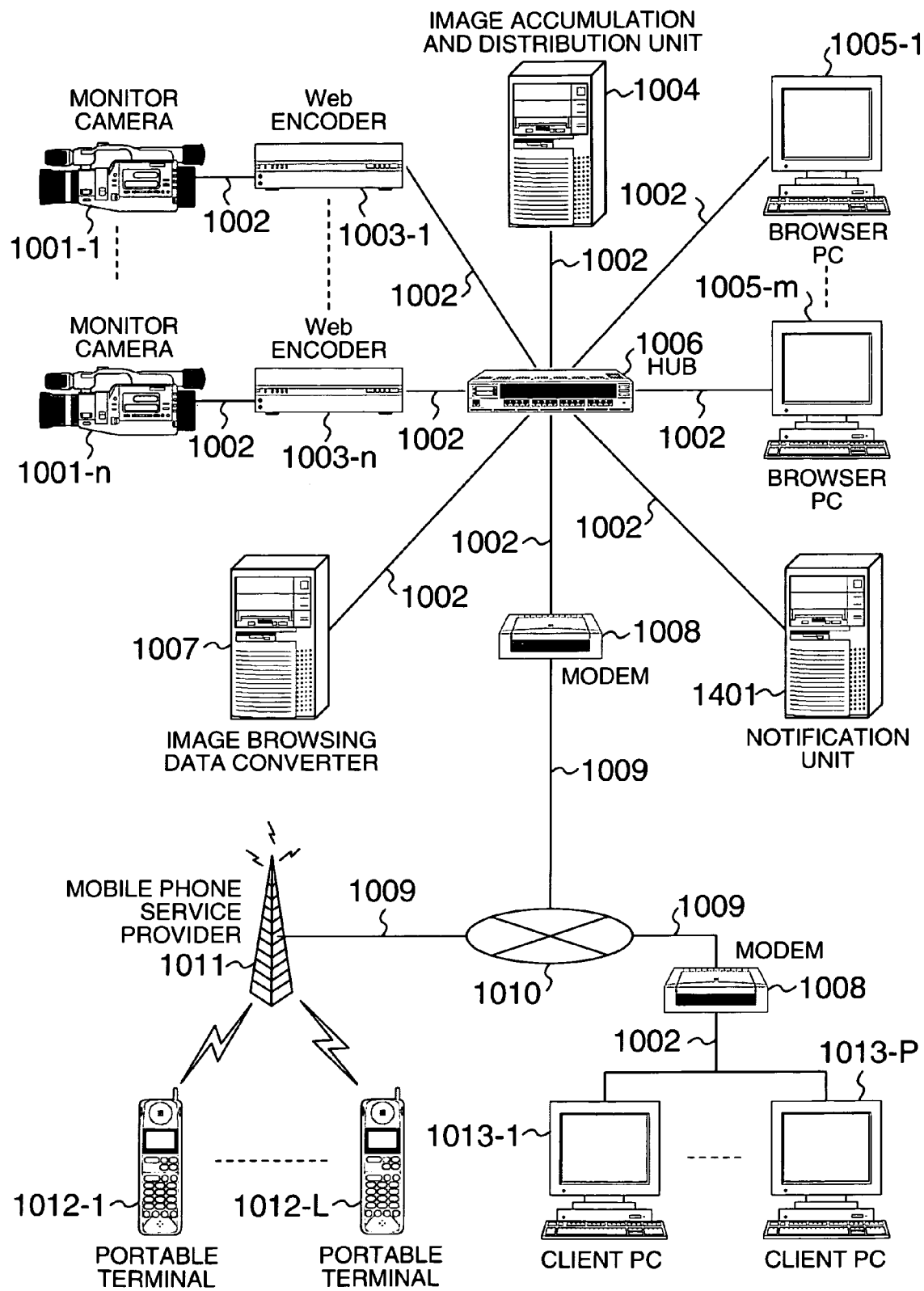
FIG. 1 is a block diagram showing a video distribution system according to an embodiment of this invention.

Embodiments of the invention are described below with reference to the accompanying drawings. Similar component parts are designated by the same reference numerals, respectively, in all the drawings.

An embodiment of the invention is explained below with reference to FIGS. 1, 2 and 3. FIG. 1 shows a configuration of a video distribution system according to this embodiment.

In FIG. 1, reference numerals 1001-1, 1001-2, . . . , 1001-$n$ (n: 1, 2, . . . ) designate a plurality of monitor cameras. The whole of these monitor cameras is collectively referred to as a monitor camera 1001. This is also the case with other component parts. Numeral 1002 designates video signal transmission paths like LAN (local area network), numerals 1003-1, 1003-2, . . . , 1003-$n$ Web encoders for compressing the video signal, etc. to conform with the transmission scheme of the transmission paths 1002, numeral 1004 an image accumulation and distribution unit having the function of accumulating and distributing the images from a plurality of the monitor cameras to the requesting users, numeral 1005-1, 1005-2, . . . , 1005-$m$ (m: 1, 2, . . . ) browser PCs having the function of managing the whole video distribution system, and numeral 1006 a hub having the function of connecting to the transmission paths 1002 by switching the signals from the various units or the function of connecting to the various units by distributing the signals. Numeral 1007 designates an image browsing data converter having such a function that a part of the images accumulated in the image accumulation and distribution unit 1004 is reduced into a form accessible from a portable terminal. Specifically, the data converter 1007 has the function of preparing and accumulating a reduced image (also called the thumb nail image) reduced in the data amount of the image transmitted to the portable terminal. Numeral 1008 designates a modem having the function of converting the video signal into a predetermined signal format adapted to be sent to the public telephone line or the like. Numeral 1009 designates a transmission path of the public telephone line, numeral 1010 a WAN (wide area network) network like the Internet, numeral 1011 a mobile phone service provider, numerals 1012-1, 1012-2, . . . , 1012-L (L: 1, 2, . . . ) portable terminals, numerals 1013-1, 1013-2, . . . , 1013-$p$ (p: 1, 2, . . . ) client PCs, and numeral 1401 a notification unit. The browsing data converter 1007, the notification unit 1401, a plurality of the monitor cameras 1001, a plurality of the Web encoders 1003, the image accumulation and distribution unit 1004 and a plurality of the browser PCs 1005 are interconnected through the transmission paths 1002 and the hub 1006. The hub 1006 is connected to the WAN network 1010 through the modem 1008 and the transmission path 1009 which is a public telephone line. Further, the portable telephones 1012-1 to 1012-L are communicable with the mobile phone service provider 1011 by radio, and the client PCs 1013-1 to 1013-$p$ are connected to the network 1010 through the transmission paths 1002 and the modem 1008.

The notification unit 1401 has the function of retrieving or fetching and comparing an image from the image accumulation and distribution unit 1004 with the previously retrieved image, and extracts any change in the image. The notification unit 1401 thus has the function of detecting and accumulating an abnormality by so-called image recognition technique. The technique of detecting an abnormality by image recognition is a well-known method for detecting a change of the brightness component of the preceding and following frame screens or comparing the video signal spectra, and therefore is not explained in detail.

In the case where the image is found to have undergone any change from the result of comparison, the notification unit 1401 stores the particular image together with the date and time when the abnormality is detected and the required message, in the storage of the notification unit 1401, while at the same time distributing the abnormality alarm information to the portable terminals 1012 and the client PCs 1013.

Figure 9:
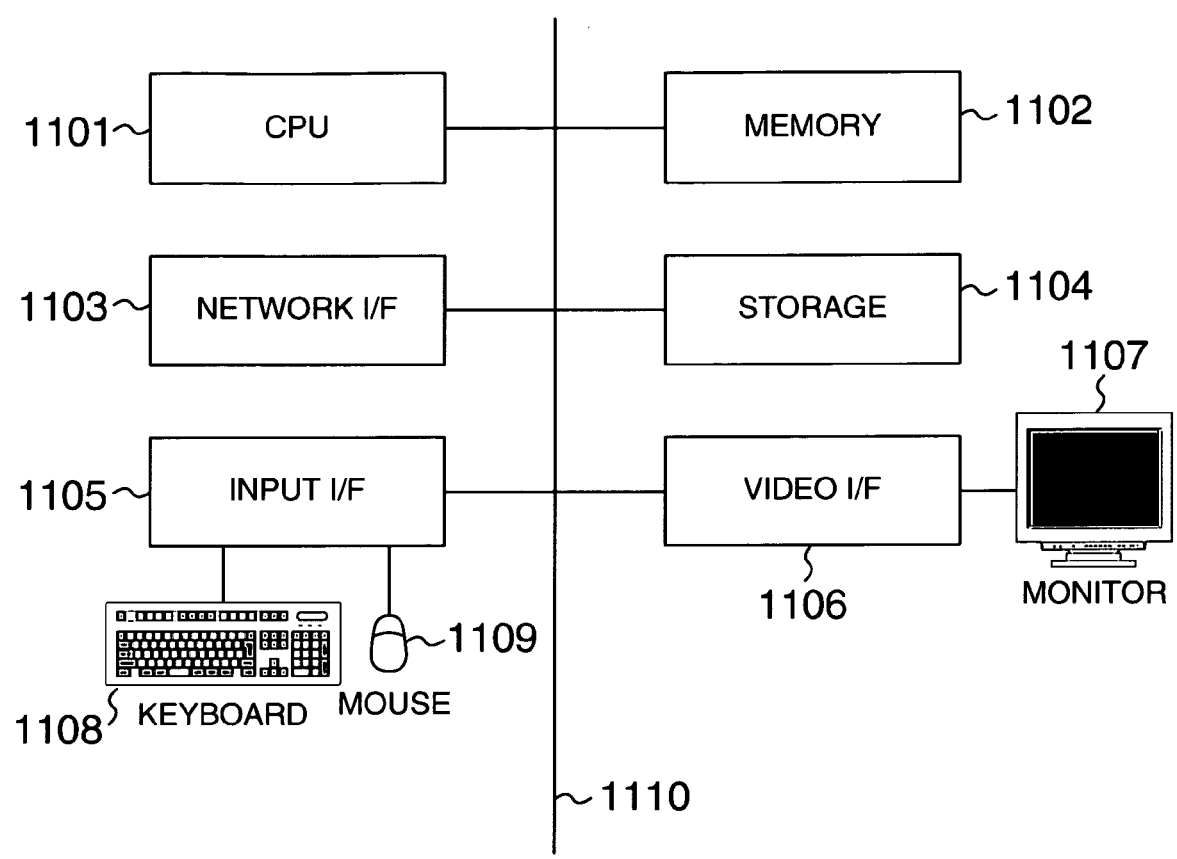
FIG. 9 is a block diagram showing a hardware configuration of an image accumulation and distribution unit, etc. used in a video distribution system according to an embodiment of the invention.

FIG. 9 is a block diagram showing an example of hardware configuration of respective units including the image accumulation and distribution unit 1004, the browser PCs 1005, the image browsing data converter 1007, the portable terminals 1012 and the client PCs 1013. Although a different function is of course accompanied by different software (operation program) installed in respective unit, the hardware configuration is similar and shown as an example. Numeral 1101 designates a CPU (central processing unit), numeral 1102 a memory for storing the operation program, etc., and numeral 1103 a network interface.

Numeral 1104 designates a storage. As the storage for the image accumulation and distribution unit 1004, a recording medium having a large storage capacity such as a VTR is usable to record the images of the monitor cameras 1001. A random-access magnetic disk (hard disk (HD)) or a DVD (digital versatile disk) is another choice. Numeral 1105 designates an input interface, numeral 1008 a keyboard or the like input device, numeral 1009 a mouse or the like pointing device, numeral 1106 a video interface, numeral 1107 a monitor, and numeral 1110 a bus.

All the devices from the CPU 1101 to the video interface 1106 are connected to each other through the bus 1110. The monitor 1107 is connected to the bus 1110 through the video interface 1106. The input device 1108 and the pointing device 1009 are connected to the bus 1110 through the input interface 1105. Also, the network interface 1103 is connected to the LAN transmission path 1002 or the public telephone line 1009, as required.

Returning to FIG. 1, the images picked up by the monitor cameras 1001 are accumulated in the image accumulation and distribution unit 1004 and distributed. Each monitor camera 1001 installed at a predetermined monitor position, for example, constantly picks up images, and the images thus picked up are accumulated in the image accumulation and distribution unit 1004 through the transmission paths 1002, the Web encoders 1003 and the hub 1006. By operating the portable terminals 1012 and the client PCs 1013, the image browsing data converter 1007 retrieves or fetches the desired image from the image accumulation and distribution unit 1004, and transmits it to the portable terminals 1012 and the client PCs 1013 as a reduced image. In the case where the client PCs 1013 or the portable terminals 1012 are capable of displaying an image of large data amount, the required image may be transmitted directly from the image accumulation and distribution unit 1004. In this way, the images stored in the image accumulation and distribution unit 1004 can be browsed from the portable terminals 1012 and the client PCs 1013.

The operation of the image distribution system shown in FIG. 1 is explained below with reference to the flowchart of FIG. 2. FIG. 2 is a flowchart for explaining the operation in which the notification unit 1401 detects a change in the image from the image accumulation and distribution unit 1004 using the well-known image recognition technique and transmits the abnormality alarm information to the portable terminals 1012 and the client PCs 1013.

Figures 10, 11:
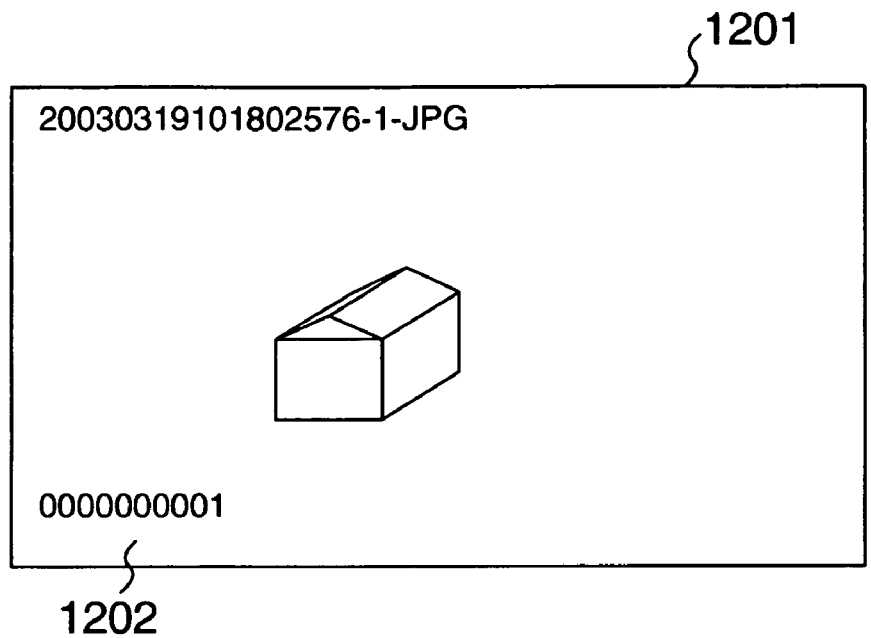
FIG. 10 is a diagram showing an example of the image accumulated in the image accumulation and distribution unit.
FIG. 11 is a diagram showing an example of an ID table used with a video distribution system according to an embodiment of the invention

In step 201, the video distribution system starts the monitor operation. The image monitored by a predetermined monitor camera 1001 such as the monitor camera 1001-1 (which is hereinafter referred to as the monitor camera No. 1) is digitally compressed by the Web encoder 1003-1, and the compressed image data is accumulated in the image accumulation and distribution unit 1004 through the hub 1006. The compressed image data are recorded in the image accumulation and distribution unit 1004, as shown in FIG. 10, for example, together with the imaging date and time, the channel and the compression scheme for each digitally compressed image 1201. Specifically, FIG. 10 indicates that the image 1201 is recorded Mar. 19, 2003, at 18 minutes, 2 seconds and 576 past 10 o'clock by the monitor camera No. 1 according to JPEG (Joint Photographic Experts Group) scheme. These information are hereinafter referred to as unique information. Each image corresponding to this unique information has attached thereto a ID number 1202, such as 10-digit number "0000000001", indicating the order of recording. This ID number is used by, for example, the image browsing data converter 1007 for accessing an image in the image accumulation and distribution unit 1004. In this embodiment, the monitor cameras 1001 are each assumed to have a unique channel number, and the ID number 1202 is attached as a serial number of the image frame of each channel. Also, the format of the image data recorded in the image accumulation and distribution unit 1004 may be an arbitrary one such as MPEG-2 or MPEG-4 other than JPEG. Further, the imaging date and time may be the time point when the image is digitally compressed in the Web encoder 1003, the time point when the image is recorded in the image accumulation and distribution unit 1004, or otherwise according to the actual situation, other than the date and time when each image is picked up by the monitor camera 1001.

In step 202, the notification unit 1401 acquires one frame of image from the image accumulation and distribution unit 1004. All the images input to the image accumulation and distribution unit 1004 from the monitor cameras 1001 are read out in the order of input and supplied to the notification unit 1401.

In step 203, the notification unit 1401 executes the image recognition process such that the preceding image is compared with the presently input image in brightness value, for example, thereby to detect an image change.

In step 204, it is determined whether an image change has been detected or not by the image recognition process of step 203. Whether the image has undergone a change or not is determined by detecting the change in brightness value. In this case, an error-minimizing method can be employed as required, in which a predetermined threshold value for abnormality detection is set so that the change not more than a predetermined value is not determined as an abnormality. In the case where it is determined that an image has undergone a change as a result of detection, the process proceeds to step 205. Otherwise, the process returns to step 202 to execute a similar process for the next input image.

In step 205, the alarm information is produced for transmission to the portable terminals 1012 and the client PCs 1013. An example of the alarm information is explained with reference to FIG. 3. FIG. 3 shows an example of the screen used to display the contents of the alarm information on the portable terminals 1012. Numeral 301 designates an example of the monitors 1107 of the portable terminals 1012. Numeral 302 designates a text message indicating the time when an image change is detected. The time when the image change is detected may be, for example, the date and time when the image which has undergone a change is picked up (hereinafter referred to as the alarm generation time). Numeral 303 designates the information whereby the user of a given portable terminal 1012 determines whether the image acquired at the time of change detection thereof and accumulated in the image accumulation and distribution unit 1004 is to be reproduced. Numeral 304 designates an image at the time point of image change detection, i.e. one frame of still image as of the time point when the image change is detected. The user who has grasped the outline of the monitor area and desires to confirm the details from this still image in step 208 requests a dynamic image (say, in Motion-JPEG mode) in step 209. The size of the data that can be received by each portable terminal 1012 or each client PC 1013 is generally limited. The notification unit 1401, therefore, appropriately changes the size of the image 304, i.e. the number of pixels or the compression rate of the image thereby to produce the alarm information in the form receivable by the user. Though not displayed on the screen of the portable terminal 1012, the ID number 1202 corresponding to the image at the time of alarm generation is attached to the alarm information.

In step 206, the alarm information produced by the notification unit 1401 is transmitted to the portable terminals 1012 and the client PCs 1013. Generally, electronic mail is used. However, any other method may be used whereby the alarm information can be received by the portable terminals 1012 and the client PCs 1013. The alarm information may be sent to all or specified ones of the portable terminals 1012 and the clients PC 1013, as required. In the former case, the addresses of all the destinations corresponding to all the monitor cameras are determined in advance by the browser PCs 1005, while in the latter case, the addresses of the specified destinations corresponding to the specified monitor cameras are determined in advance by the browser PCs 1005.

In step 207, the monitor operation is ended.

Next, the operation of the portable terminals 1012 or the client PCs 1013 receiving the alarm information and acquiring the required image is explained.

Assume that the alarm information transmitted from the notification unit 1401 is received by a given portable terminal 1012 or a given client PC 1013. In step 208, the alarm information produced by the notification unit 1401 is displayed on the monitor 1107 as shown in FIG. 3.

The image detected at the alarm generation time point is displayed on the portable terminal 1012 or the client PC 1013 and, in step 209, the user is requested to determine whether the image accumulated in the image accumulation and distribution unit 1004 is to be reproduced (played back) or not. If the image is to be reproduced, the answer "YES" is selected in step 303 shown in FIG. 3. In the case where "NO" is selected, on the other hand, the image is not reproduced and the image browsing is ended.

In step 210, the portable terminal 1012 or the client PC 1013 starts and executes the image browsing program installed therein in response to the selection of "YES" by the user. Once the image browsing program is executed, the ID number is acquired from the alarm information received in step 208. This ID number is used by the image browsing data converter 1007 in step 212 for acquiring the image as of the alarm generation time from the image accumulation and distribution unit 1004.

In step 211, the portable terminal 1012 or the client PC 1013 is connected to the image browsing data converter 1007 in response to the starting of the image browsing program.

In step 212, the portable terminal 1012 or the client PC 1013 acquires the image as of the alarm generation time from the image browsing data converter 1007. Specifically, in accordance with the access from the portable terminal 1012 or the client PC 1013, the ID number is delivered to the image browsing data converter 1007, and based on the ID number, the image browsing data converter 1007 acquires the image as of the alarm generation time from the image accumulation and distribution unit 1004. The acquired image is reduced (by removing some of the pixels) in a manner displayable on the portable terminal 1012 or the client PC 1013, as the case may be. The reduced image is sent to the portable terminal 1012 or the client PC 1013. In this way, the image browsing data converter 1007 has the function of distributing the reduced image data (the image data from which some pixels are removed) in response to the request of the portable terminal 1012 or the client PC 1013.

In step 213, the image as of the alarm generation time acquired in step 212 is displayed, together with the replay operation button, on the monitor 1107 of the portable terminals 1012 or the client PCs 1013. An example of the image displayed is shown in FIG. 4. FIG. 4, like FIG. 3, is a diagram showing the monitor 1107 of the portable terminal 1012 or the client PC 1013. Numeral 401 designates a display section for sequentially displaying the compressed image data sent from the image browsing data converter 1007 in the case where the replay button is operated. Numeral 402 designates the time when the particular image 401 is picked up. Numeral 403 designates symbols indicating the present replay (reproduction) condition. In FIG. 4, for example, the symbol ">" indicates the replay going on, the symbol "||" (not shown) the replay in suspension, the symbol ">>" (not shown) the rapid feed, and the symbol "<<" (not shown) in rewind operation. At the end of reproduction, therefore, the symbol "||" indicating the replay in suspension is displayed. The operattion method is the same as ordinary VTRs. Numeral 404 designates an end button. The replay operation is started or stopped in accordance with an instruction input through the keys of the portable terminal 1012 or the client PC 1013. In giving a replay start or stop instruction, the symbol 403 is changed to a corresponding one. The symbol 403 may alternatively be characters such as "replay" or "suspended".

In step 214, it is determined whether the video reproduction is to be started or not. When a replay instruction is given by way of the keys of the portable terminal 1012 or the client PC 1013, the process proceeds to step 215. Otherwise, the browsing is ended.

In step 215, the image is acquired from the image browsing data converter 1007. The portable terminal 1012 or the client PC 1013 requests from the image browsing data converter 1007 an image advanced one frame each relative to the image acquired in step 212 as an initial image. The image browsing data converter 1012 acquires the image from the image accumulation and distribution unit 1004, and transmits reduced image data to the portable terminal 1012 or the client PC 1013. For example, the image browsing data converter 1007 requests the image accumulation and distribution unit 1004 to acquire the image corresponding to the ID number which is the ID number of the image as of the alarm generation time, plus 1.

In step 216, the transmitted image is displayed on the monitor 1007 of the portable terminal 1012 or the client PC 1013.

In step 217, it is determined whether the image replay operation is to be ended or not. In the case where an instruction is issued to end the image replay operation, the image replay process is ended. Otherwise, the process returns to step 215 to continue the image replay operation. The instruction to end the image replay operation is given by manipulating a key corresponding to the end button 404 from the portable terminal 1012 or the client PC 1013.

In the foregoing description of embodiment, the portable terminal 1012 or the client PC 1013 acquires a reduced image from the image browsing data converter 1007. In the case where the client PC 1013 has the function of image reproduction according to JPEG, etc., however, the images in the image accumulation and distribution unit 1004 can of course be accessed and acquired directly. Further, the notification unit 1401, the image accumulation and distribution unit 1004 and the image browsing data converter 1007, which are arranged independently of each other according to the embodiment described above, may alternatively be integrated in one unit. Depending on the functions of each portable terminal 1012 or each client PC 1013, the images from the image accumulation and distribution unit 1004 or the image browsing data converter 1007 can of course be sent either frame by frame or a plurality of frames at a time. For example, the dynamic image data for the time period of 10 seconds from the alarm generation time may be sent at a time to the portable terminals 1012 or the client PCs 1013. Alternatively, the images may be sent one frame at a time in response to a request of the user.

By the process described above, the alarm information is received by the portable terminal 1012 or client PC 1013, and the images accumulated in the image accumulation and distribution unit 1004 may be reproduced as reduced image data with the image as of the alarm generation time being the initial screen. Also, the video distribution system according to the invention has both the function of distributing by accumulating all the images of the monitor cameras in the image accumulation and distribution unit 1004 as digitized dynamic images and the function of distributing by accumulating the image data of the image accumulation and distribution unit 1004 as reduced image data having a small data amount by the operation of the image browsing data converter 1007. Therefore, the reduced image data are transmitted from the image browsing data converter 1007 to the terminal units such as the portable terminals 1021 capable of displaying only limited data while the dynamic images can be distributed directly from the image accumulation and distribution unit 1004 to the terminals like the client PCs 1013 having the function of reproducing the dynamic images (say, the JPEG compressed images). This configuration can construct a video distribution system capable of providing sufficient services also to the clients desirous of acquiring detailed data on faulty monitor images.

Another embodiment of the invention is explained below with reference to FIGS. 5 to 7 and 11.

Figure 2:
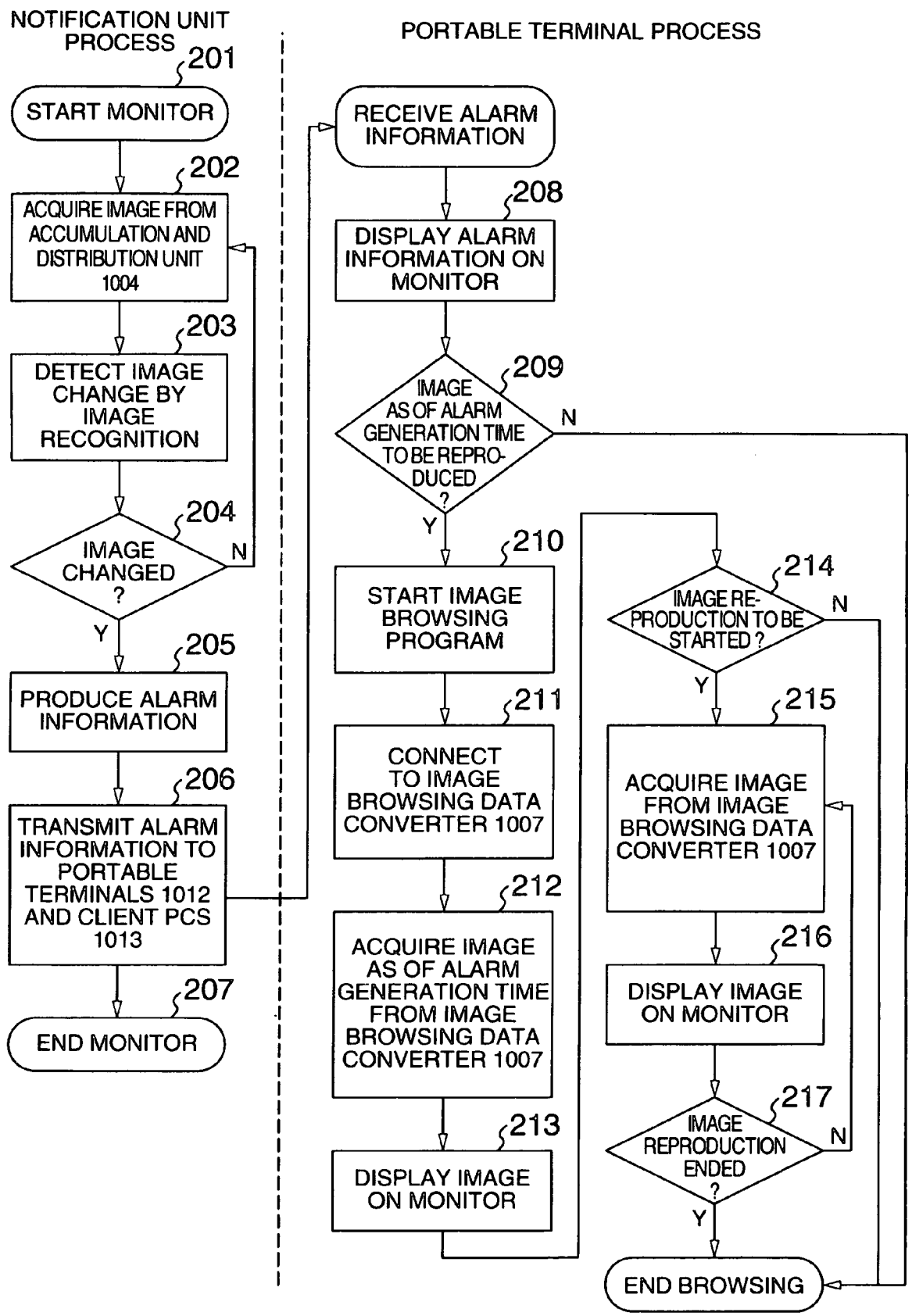
FIG. 2 is a flowchart for explaining a video distribution method according to an embodiment of the invention.

The portable terminal 1012 used with the embodiment shown in FIG. 2 is required either to be a dedicated terminal or have a sufficient function to install an image browsing program operatively interlocked with the electronic mail described in step 210 and subsequent steps. Nevertheless, there are some models of multi-purpose portable terminal that have no sufficient capacity of the memory 102 or have so low a capability that the image browsing program cannot be installed in operatively interlocked with the electronic mail, thereby often leading to a case in which the image browsing data converter 1007 cannot be accessed directly. For example, information cannot be exchanged with the alarm information received by electronic mail and the ID number cannot be acquired from the alarm information. In such a case, the user is required to reproduce the desired image by retrieving the alarm generation time using the portable terminal 1012.

In order to make possible this function, according to this embodiment, the notification unit 1401 accumulates the above-described ID number (ID No.) and unique information (imaging date and time, channel and compression scheme) of the related image in association with each other each time an abnormality is detected. Specifically, as shown in FIG. 11, an ID table is stored in the storage 1104 of the notification unit 1401. The imaging date and time stored in the ID table represents an alarm generation time described above. The portable terminal 1012 selects an alarm generation time accumulated in the notification unit 1401, so that the initial screen at the time of image generation can be selected thereby making it possible to acquire the desired image. This method is explained below with reference to FIGS. 5 to 7.

FIG. 5 is a flowchart for explaining this embodiment. In FIG. 5, steps 201 to 208 and 214 to 217 are similar to the corresponding steps of the flowchart shown in FIG. 2 and therefore not explained again.

Figure 3:
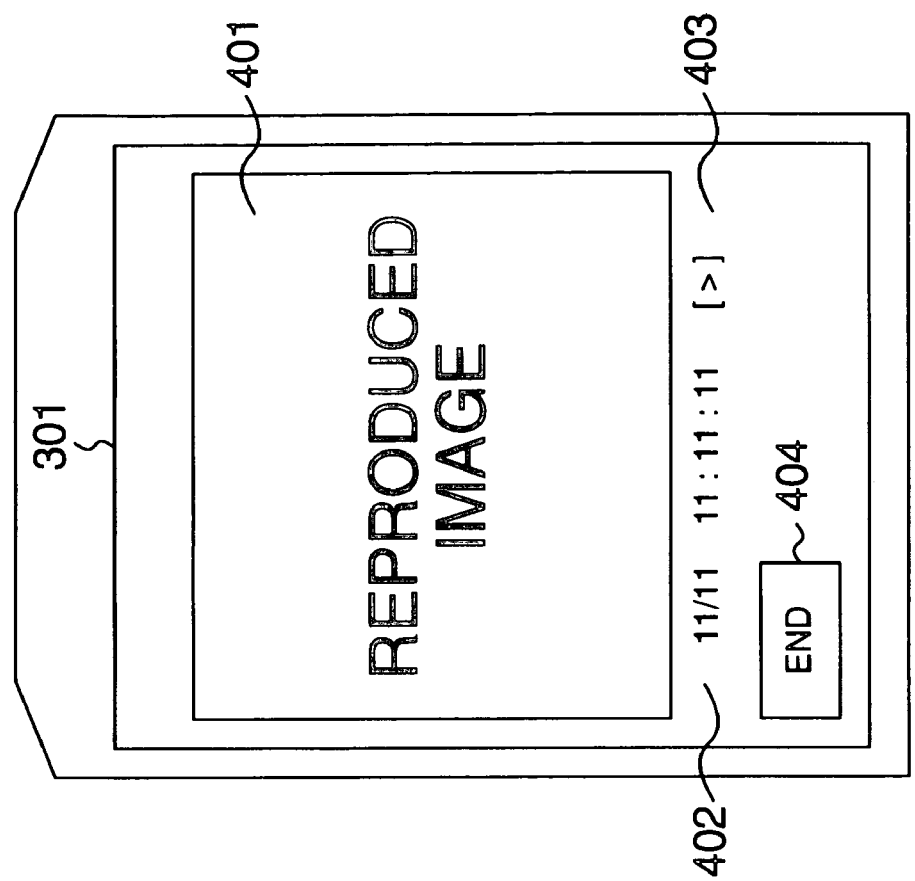
FIG. 3 is a diagram showing an example of the monitor display screen of an information terminal used with a video distribution system according to an embodiment of the invention.
Figure 4:
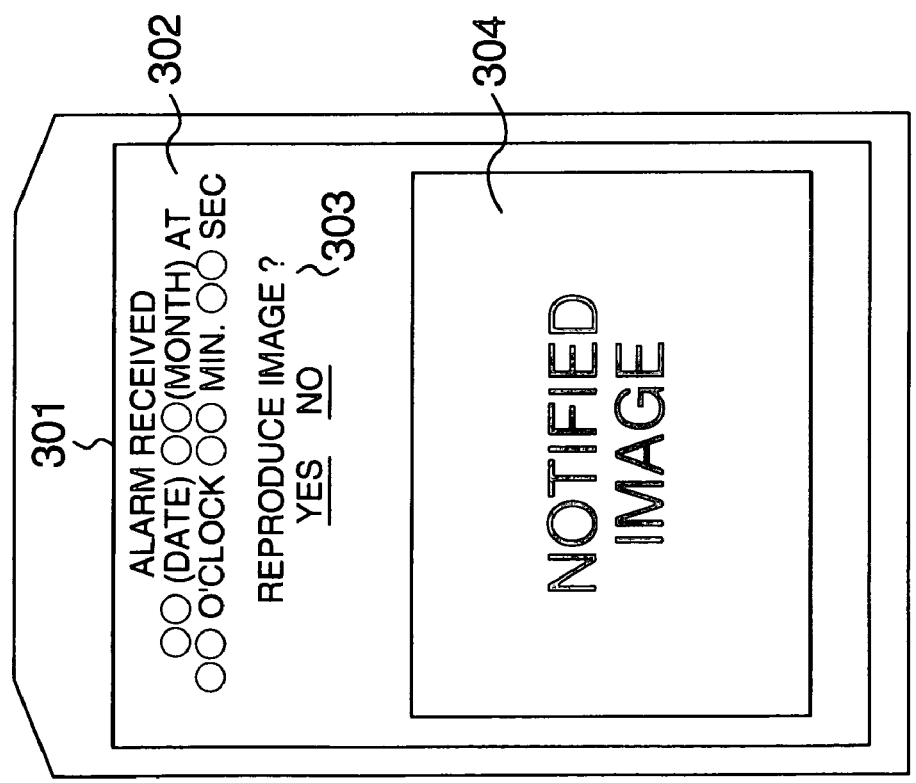
FIG. 4 is a diagram showing another example of the monitor display screen of an information terminal used with a video distribution system according to an embodiment of the invention.

In step 208, as in FIG. 2, the alarm information shown in FIG. 3 is displayed on the portable terminal 1012 or the client PC 1013 by electronic mail. In order to proceed with the image reproduction, the process described below is executed by operating specific keys on the portable terminal 1012 or the client PC 1013. As an alternative, as in FIG. 2, "YES" is selected in step 303 in FIG. 3. The process after selecting the image reproduction is explained below.

In step 501, the user informed of an abnormality by viewing the alarm information of electronic mail displayed on the monitor of the portable terminal 1012 or, for example, the portable terminal 1012-1 starts the video replay program by operating the keys of the particular portable terminal. The video replay program, which is smaller in size than the image browsing program operatively interlocked with the electronic mail function, can be installed even in a low-performance multi-purpose portable terminal.

Figure 6:
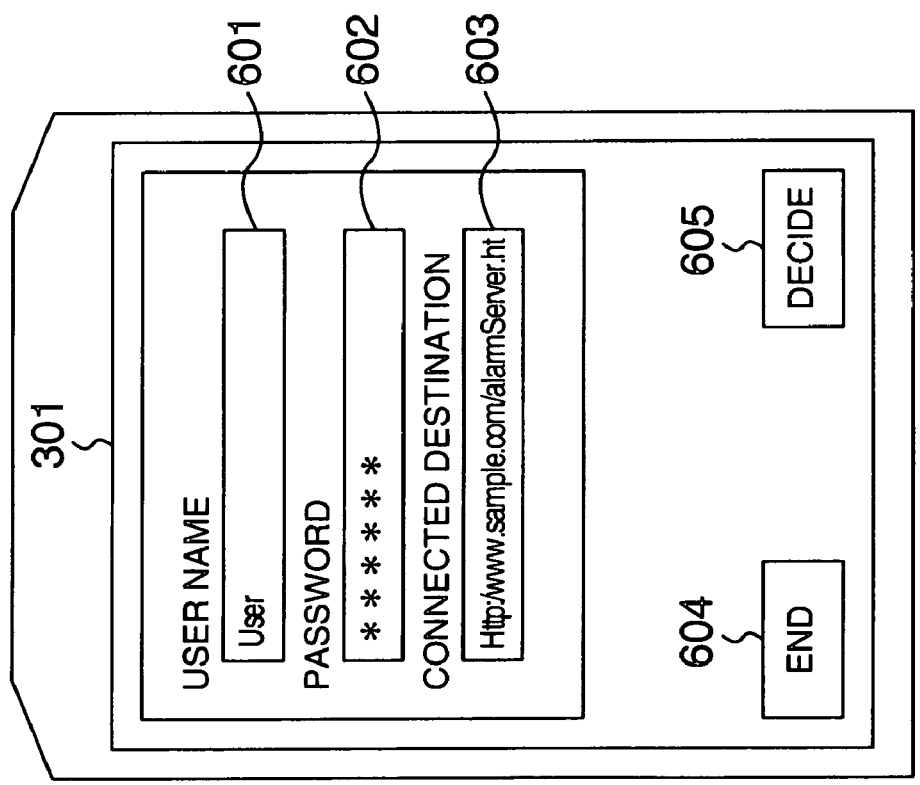
FIG. 6 is a diagram showing an example of the display screen of an information terminal used with the embodiment shown in FIG. 5.

In step 502, the portable terminal 1012-1 is connected to the notification unit 1401. FIG. 6 shows an example screen displayed on the monitor of the portable terminal 1012-1. In FIG. 6, numeral 601 designates a user name input section (field), numeral 602 a password input section (field), and numeral 603 a destination input section (field) for inputting, for example, the address of the notification unit 1401. Numeral 604 designates an end button, and numeral 605 a decision button. First, the user name and the password registered in the notification unit 1401 are input through the user name input section 601 and the password input section 602, respectively. Thus, an illegitimate user is prevented from reproducing the images by connecting to the notification unit 1401. Next, the address of the notification unit 1401 constituting a destination is input. By depressing the decision button 605, the portable terminal 1012-1 can be connected to the notification unit 1401.

In step 503, the portable terminal 1012-1 acquires the alarm generation time accumulated in the notification unit 1401 from the notification unit 1401. Specifically, the information in the ID table (indicating the alarm generation time) shown in FIG. 11 is transmitted to the portable terminal 1012-1. Incidentally, the ID table shown in FIG. 11 is created by the notification unit 1401 in step 205, for example.

Figure 7:
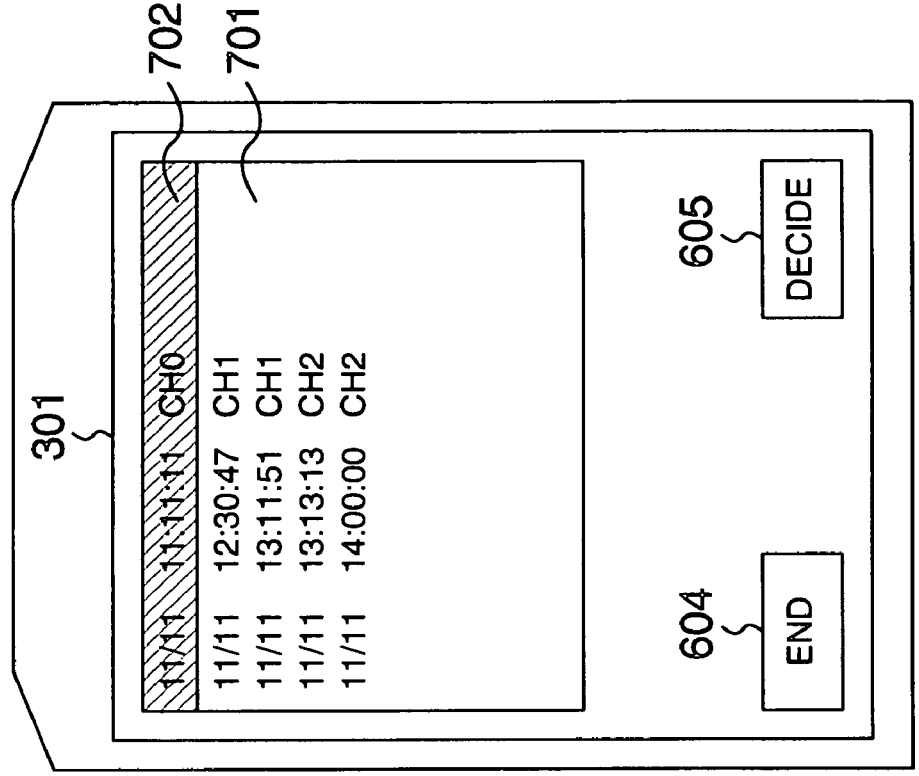
FIG. 7 is a diagram showing another example of the display screen of an information terminal used with the embodiment shown in FIG. 5.

In step 504, the ID table acquired in step 503 is processed into an alarm generation time list shown in FIG. 7 and displayed on the monitor 1107 of the portable terminal 1012-1. In processing the ID table, the whole list is made visible by scrolling since the display area of the monitor is limited.

In step 505, the time desired by the user is selected from the alarm generation time list (indicating the alarm generation time) displayed in step 504, and the decision button 605 is clicked.

In step 506, in response to the selection of the alarm generation time by the user in step 505, the notification unit 1401 connects the image browsing data converter 1007 to the portable terminal 1012-1.

In step 507, the image at the alarm generation time selected in step 505 is acquired from the image browsing data converter 1007, and displayed on the monitor 1107 of the portable terminal 1012-1 in a form similar to that shown in FIG. 4.

The process of steps 504 to 507 is explained in more detail with reference to FIG. 7. Numeral 701 designates an alarm generation time list display section of the portable terminal 1012-1. The alarm generation time list is displayed by being processed in the manner shown in FIG. 7 from the information supplied in the ID table of FIG. 11 described above. Numeral 702 designates the alarm generation time selected by the user. The user of the portable terminal 1012-1 selects a desired time from the alarm generation time list displayed in the list display section 701 in step 504. The selected time, as designated by 702, is displayed in reverse video clearly indicating the selected state. Step 506 is executed in the case where the decision button 605 is depressed in step 505. The portable terminal 1012-1 is connected to the image browsing data converter 1007 in preparation for image reproduction. In step 506, for example, the ID number corresponding to the selected alarm generation time is delivered from the notification unit 1401 to the image browsing data converter 1007. At the same time, the portable terminal 1012-1 is connected to the image browsing data converter 1007 by the notification unit 1401. In step 507, the image at the selected alarm generation time is acquired from the image browsing data converter 1007 and displayed in the monitor 1107. In the process, the image browsing data converter 1007 acquires the image at the alarm generation time from the image accumulation and distribution unit 1004 based on the ID number, reduces the acquired image into a form displayable on the portable terminal 1012-1, and transmits the resultant image to the portable terminal 1012-1.

The configuration described above makes it possible to acquire the desired initial screen and reproduce the image with a simple operation even in the case where information cannot be exchanged between the alarm information and the video replay program.

Figure 8:
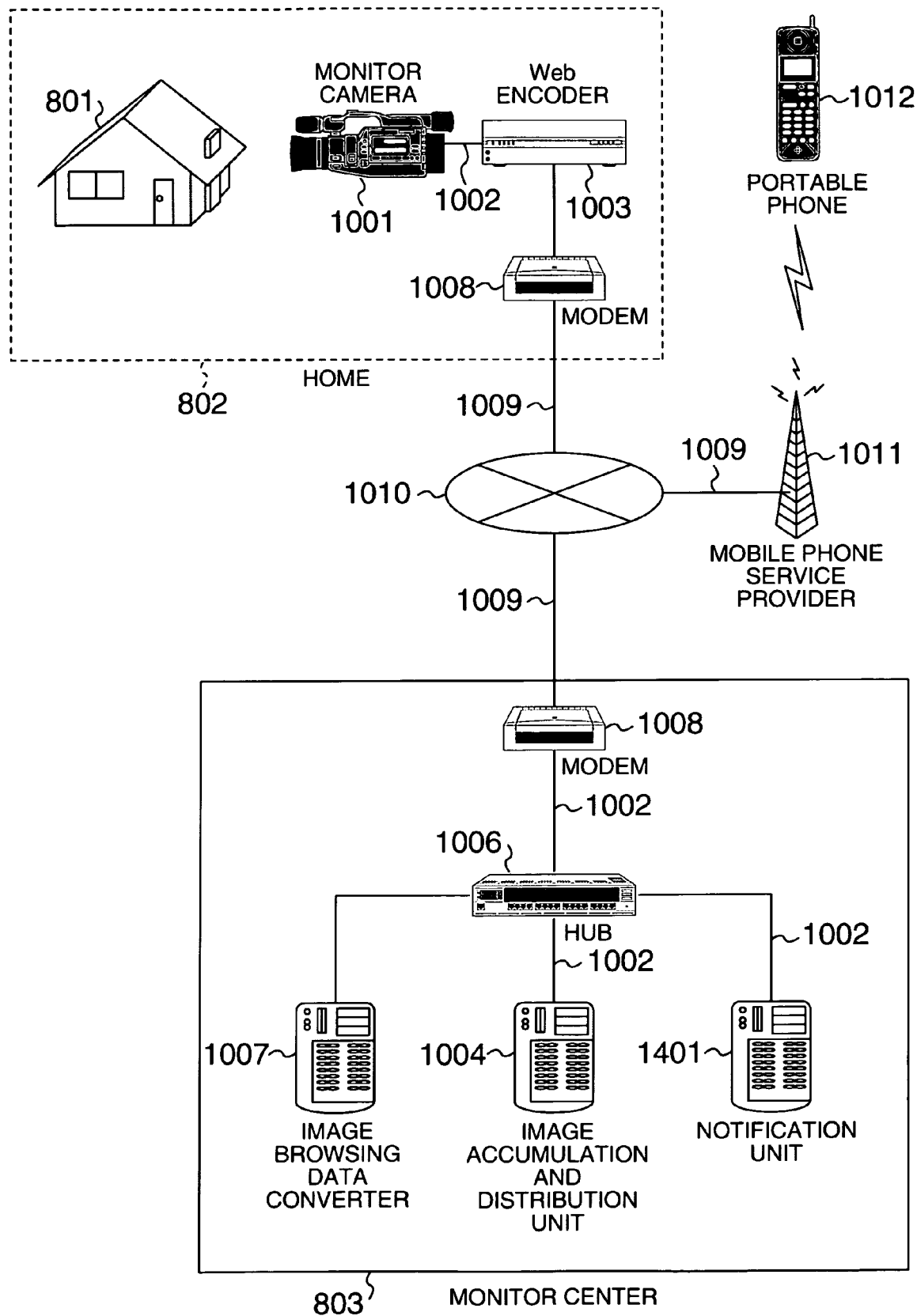
FIG. 8 is a block diagram showing a video distribution system according to still another embodiment of the invention.

Still another embodiment of the invention is explained with reference to FIG. 8. FIG. 8 shows a system for informing the user of an abnormality which may occur in his/her home, using the portable terminal from outside of the home according to the embodiment of the invention. In FIG. 8, the component parts identical or similar to those in FIG. 1 are designated by the same reference numerals, respectively. Numeral 801 designates a private home of a person to be monitored. Numeral 802 designates a configuration of the home monitor system installed in the home 801. The home monitor system 802 is configured of a monitor camera 1001, a Web encoder 1003 and a modem 1008. Numeral 803 designates a monitor center configured of a modem 1008, a hub 1006, an image accumulation and distribution unit 1004, an image browsing data converter 1007 and a notification unit 1401.

The image picked up by the monitor camera 1001 of the home monitor system 802 installed in the home 801 is stored constantly in the image accumulation and distribution unit 1004 in the monitor center. At the same time, the home 801 is monitored for an abnormality by the notification unit 140. In the case where the notification unit 1401 detects an intruding object in the home 801, the alarm information is sent to the portable terminal 1012 outside the home through the WAN 1010 and the mobile phone service provider 1011. The user who has received the alarm information can know an outline of the abnormality including the time and type thereof by reviewing the time of occurrence thereof and a still image showing the abnormality. The operation of the image accumulation and distribution unit 1004, the image browsing data converter 1007 and the notification unit 1401 is identical to those explained with reference to FIG. 1 and are not explained again.

In the case where the user is desirous of the detailed information about the situation immediately before or after the alarm generation time, the monitor center 803 is accessed from the portable terminal 1012 and the image at the alarm generation time is acquired from the image browsing data converter 1007. In this way, the situation immediately before and after the particular image is picked up can be reproduced as a dynamic image at the rate of about ten frames per second, for example, according to JPEG compression. As a result, it can be accurately determined whether the intruding object is a real intruder or a visitor.

Figure 12:
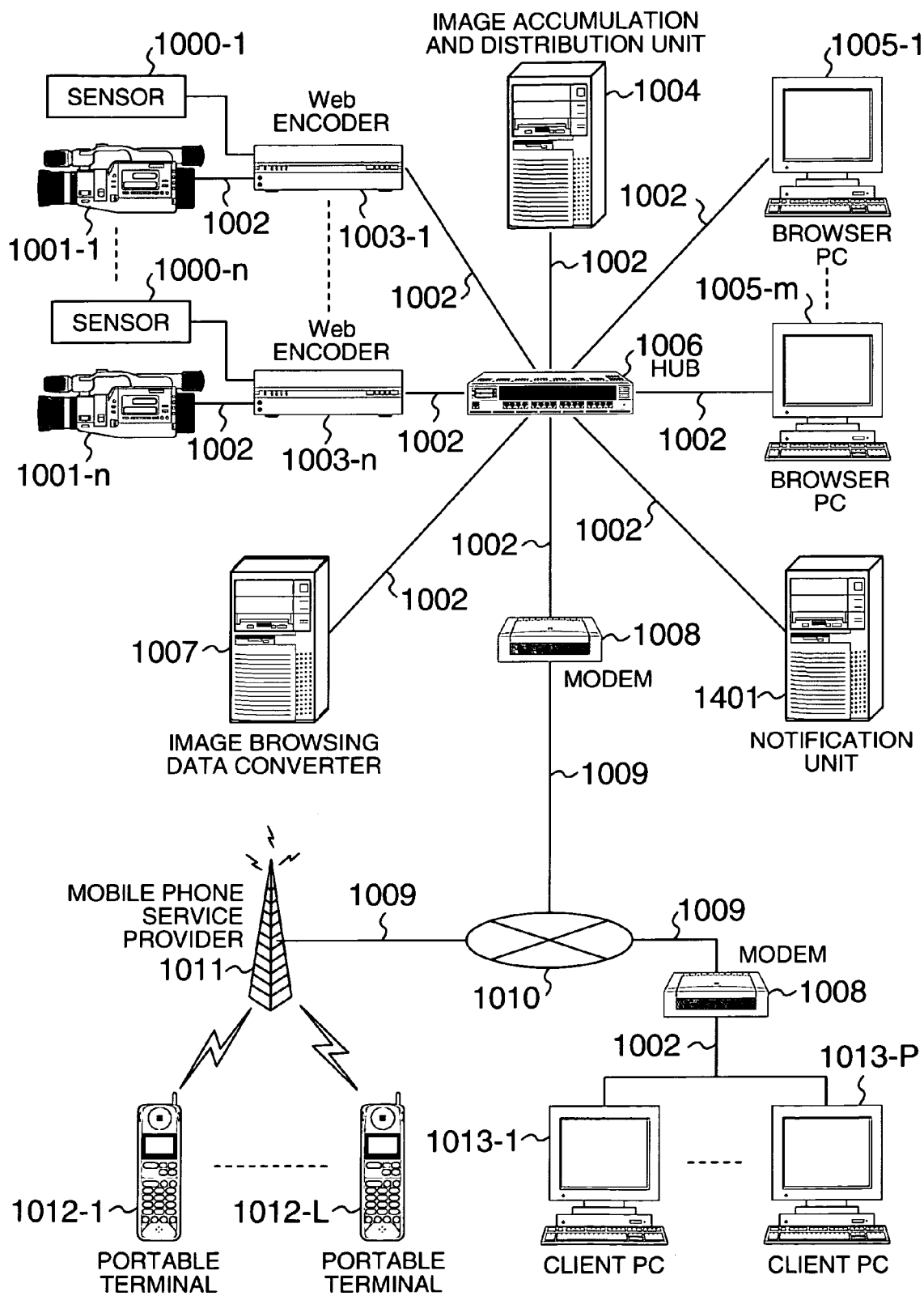
FIG. 12 is a block diagram showing a configuration of a video distribution system according to another embodiment of the invention.

Yet another embodiment of the invention is explained with reference to FIG. 12. The embodiments described above are so configured that the alarm information is transmitted by the notification unit in the case where a change of the image, i.e. an abnormality occurring in the image pickup range of the monitor camera is detected using the image recognition technique. As an alternative configuration, an infrared sensor, an ultrasonic sensor, a smoke sensor, a gas leakage sensor or the like external sensor for detecting an abnormality may be installed in the monitor area, and based on the abnormality detection by any of the sensors, the notification unit transmits the alarm information. The configuration of an image distribution system using such an external sensor is shown in FIG. 12. The configuration shown in FIG. 12 is identical with that of FIG. 1 except for the external sensors added to the configuration of FIG. 1.

In FIG. 12, external sensors 1000-1 to 1000-$n$ are installed in the image pickup ranges of the monitor cameras 1001-1 to 1001-$n$, respectively, and the outputs of these external sensors are applied to the Web encoders 1003-1 to 1003-$n$, respectively. The output of each sensor is supplied to an alarm unit, i.e. a notification unit 1401 through the transmission paths 1002 and the hub 1006. The alarm unit 1401 transmits the alarm information including a frame of still image as of the time point when the image is picked up in accordance with the abnormality detection by any of the external sensors.

The configuration of FIG. 12 includes one external sensor in the image pickup range of each monitor camera. Nevertheless, the required number of sensors of the required types may of course be provided. The configuration and operation of this video distribution system are similar to those shown in FIG. 1 except for the aforementioned points, and therefore are not described again.

The foregoing description refers to the embodiments of the invention, and it is apparent to those skilled in the art that the present invention is variously modifiable without departing from the spirit thereof and the scope specified in the claims appended hereto.

According to the embodiments described above, for example, the ID number corresponding to the image as of the alarm generation time is delivered from the portable terminal 1012 to the image browsing data converter 1007, and based on this ID number, the image browsing data converter 1007 acquires the image as of the alarm generation time from the image accumulation and distribution unit 1004. Nevertheless, the information for specifying the image as of the alarm generation time of the image accumulation and distribution unit 1004 is not limited to the ID number, but may include various factors such as the channel number and the alarm generation time in accordance with the actual system setting.

In the embodiment (FIGS. 2 and 3) described above, the ID number 1202 corresponding to the image as of the alarm generation time is attached to the alarm information transmitted from the notification unit 1401 to the portable terminals 1012, and in step 210, each portable terminal 1012 acquires the ID number from the alarm information received. As an alternative, without adding the ID number 1202 corresponding to the image as of alarm generation time to the alarm information transmitted from the notification unit 1401 to the portable terminal 1012, the information containing the abnormality detection time (alarm generation time), the related channel and an ID number of corresponding image may be accumulated in association with each other and managed in the notification unit 1401. Specifically, the ID table as shown in FIG. 11 is stored in the storage 1104 of the notification unit 1401. In this case, the image browsing data converter 1007 acquires the image as of the alarm generation time from the image accumulation and distribution unit 1004 based on the ID table held by the notification unit 1401 in response to an access from the portable terminal 1012 or the client CP 1013, and transmits the acquired image to the portable terminal 1012 or the client PC 1013, as the case may be.

Also, according to the embodiments described above, upon selection of "YES" as a response to the question 303 in FIG. 3, the image as of alarm generation time is reproduced as an initial screen. The invention, however, is not limited to the case of the embodiments above, but upon selection of "YES" designated by 303 in FIG. 3, the image picked up a predetermined time before the alarm generation time may alternatively be reproduced as an initial screen. In such a case, the image browsing data converter 1007 acquires the image from the image accumulation and distribution unit 1004 by designating a predetermined younger ID number than the one associated with the alarm generation time. As another alternative, the image picked up a predetermined time later than the alarm generation time may be reproduced as an initial screen.

According to the embodiments described above, the desired image can be acquired as a compressed image or a dynamic image in accordance with the user terminal function based on the time information generated in the alarm information sent by the notification unit. Also, even a low-performance information terminal can acquire a required still image by displaying and selecting the alarm generation time in a list. As a result, the image as of the alarm generation time can be confirmed more easily than in the prior art.

The foregoing description deals with the invention applied to a video distribution system and a video distribution method. This invention, however, is not limited to them but widely applicable to other video distribution systems and video distribution methods with equal effect.

According to the embodiments described above, the image browsing data converter and the notification unit are arranged in the same system, so that the desired image can be acquired as an initial screen based on the abnormality time information without retrieving the image as of abnormality occurrence time sent from the notification unit. Also, the image immediately before or after the abnormality occurrence time can be acquired as a still image or a dynamic image. As a result, the information as to whether a given abnormality is to be warned against or not can be determined quickly by a simple operation.

Further, even a portable terminal having such a low performance that the alarm information cannot be exchanged with the video replay program can easily acquire the initial screen for image reproduction by accumulating the alarm generation time in the notification unit, displaying the alarm generation time as a list on the portable terminal and selecting the required abnormality time from the list. Thus, great advantages are achieved whereby the operation of retrieving the time of the image to be reproduced is eliminated, and the desired image can be quickly acquired.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A video distribution system connected to a communication network for distributing an image in response to a request, comprising:
   at least one image pickup unit for picking up an image of a predetermined monitor area and converting said image into a video signal;
   at least one encoder connected to receive the video signal from said image pickup unit, each encoder encoding the video signal from an associated image pickup unit and sending said encoded video signal to said network;
   an image accumulation and distribution unit connected to said network for accumulating the encoded video signal from a designated encoder, said image accumulation and distribution unit attaching unique information to each image frame;
   a data converter for image browsing, connected to said network, for reading the accumulated image from said image accumulation and distribution unit and converting said image into a reduced image in response to a request;
   at least one information terminal with or without a browsing program installed therein, connected by wire or radio to said network for acquiring and displaying an image by accessing said image accumulation and distribution unit or said data converter for imaging browsing; and
   a notification unit connected to said network for reading the accumulated image from said image accumulation and distribution unit, detecting an image change indicating an abnormality in said predetermined area, accumulating the unique information on the image change and displaying alarm information containing the change occurrence time on an associated information terminal,
   wherein said information terminal accesses said image accumulation and distribution unit or said data converter for image browsing in response to an operation of said associated information terminal by a user and acquires the image in a predetermined time range related to said change occurrence time from said image accumulation and distribution unit or said data converter, and
   wherein, for an information terminal having the browser program interlocked with an email function, said notification unit sends unique information on an image change to the information terminal via email, and in response, said data converter for image browsing sends a reduced image corresponding to said unique information received from said information terminal to said information terminal and, for an information terminal having no browser program interlocked with the email function, said notification unit, in response to connection from said information terminal, sends unique information accumulated in the notification unit to said information terminal so as to connect the data converter to said information terminal in response to selection of the unique information by the information terminal, wherein said data converter distributes an image in a form displayable on said information terminal to said information terminal.

2. A video distribution system according to claim 1, wherein said information terminal displays in a display section thereof said alarm information including at least said image change occurrence time, the image as of said change occurrence time and a symbol allowing an information terminal user to select whether the image in said predetermined time range continues to be reproduced or not.

3. A video distribution system according to claim 2, wherein said information terminal displays in the display section thereof the image in said predetermined time range together with a symbol indicating the present reproduction condition in response to said selection of the continued reproduction.

4. A video distribution system according to claim 1, wherein said information terminal acquires the image in said predetermined time range from said data converter and displays said image in dynamic image mode in the display section of said information terminal.

5. A video distribution system according to claim 1, wherein said information terminal acquires the image in said predetermined time range from said data converter and displays said image, frame by frame, in the display section of said information terminal in response to the request of said user of said information terminal.

6. A video distribution system according to claim 1, wherein said at least one information terminal includes at least one portable terminal and at least one client PC (personal computer).

7. A video distribution system according to claim 2, wherein said display section of said information terminal includes a field in which said user is caused to input at least the information for specifying said user of said information terminal and the address of said notification unit in response to said selection of the continued reproduction.

8. A video distribution system according to claim 7, wherein said notification unit stores said unique information in a list in association with the serial number of a corresponding image frame each time of detection of said image change, and
wherein said list is displayed in said display section of said information terminal in such a way as to permit selection of arbitrary unique information, in response to the input of said user specifying information and the address of said notification unit.

9. A video distribution system connected to a communication network for distributing an image in response to a request, comprising:
at least one image pickup unit for picking up an image of a predetermined area and converting said image into a video signal;
at least one encoder connected to receive the video signal from said image pickup unit, each encoder encoding the video signal from associated image pickup unit and sending said encoded video signal to said network;
an image accumulation and distribution unit connected to said network for accumulating the encoded video signal from a designated encoder, said image accumulation and distribution unit attaching unique information to each image frame;
a data converter for image browsing, connected to said network, for reading the accumulated image from said image accumulation and distribution unit and converting said image into a reduced image in response to a request;
at least one information terminal with or without a browsing program installed therein, connected by wire or radio to said network, for acquiring and displaying an image by accessing said image accumulation and distribution unit or said data converter for image browsing;
a sensor arranged in said predetermined area for detecting an abnormality in said predetermined area; and
a notification unit connected to said network for reading the accumulated image from said image accumulation and distribution unit, receiving the output of said sensor indicating an abnormality in said monitor area, accumulating the unique information on the image change and displaying the alarm information containing the change occurrence time on associated information terminal;
wherein said information terminal accesses said image accumulation and distribution unit or said data converter for image browsing in response to user operation of said associated information terminal and acquires the image in a predetermined time range related to said change occurrence time from said image accumulation and distribution unit or said data converter, and
wherein, for an information terminal having the browser program interlocked with an email function, said notification unit sends unique information on an image change to the information terminal via email, and in response, said data converter for image browsing sends a reduced image corresponding to said unique information received from said information terminal to said information terminal and, for an information terminal having no browser program interlocked with the email function, said notification unit, in response to connection from said information terminal, sends unique information accumulated in the notification unit to said information terminal so as to connect said data converter to said information terminal in response to selection of the unique information by the information terminal, wherein said data converter distributes an image in a form displayable on said information terminal to said information terminal.

10. A video distribution system according to claim 9, wherein said information terminal displays in a display section thereof said alarm information including at least said image change occurrence time, the image as of said change occurrence time and a symbol allowing said user of said information terminal to select whether the image in said predetermined time range continues to be reproduced or not.

11. A video distribution system according to claim 10, wherein said information terminal displays in a display section thereof the image in said predetermined time range, together with a symbol indicating the present reproduction condition, in response to said selection of the continued reproduction.

12. A video distribution system according to claim 9, wherein said information terminal acquires the image in said predetermined time range from said data converter and displays said image in dynamic image mode in the display section of said information terminal.

13. A video distribution system according to claim 9, wherein said information terminal acquires the image in said predetermined time range from said data converter and displays said image, frame by frame, in the display section of said information terminal in response to the request of said user of said information terminal.

14. A video distribution system according to claim 9, wherein said at least one information terminal includes at least one portable terminal and at least one client PC (personal computer).

15. A video distribution system according to claim 10, wherein said display section of said information terminal includes a field in which said user is caused to input at least the information for specifying said user of said information terminal and the address of said notification unit is displayed in response to said selection of the continued reproduction.

16. A video distribution system according to claim 15, wherein said notification unit stores said unique information and the serial number of a corresponding image frame in a list each time of detection of said image change, and
wherein said list is displayed in said display section of said information terminal in such a way to permit selection of an arbitrary detection time or an arbitrary channel number in response to the input of said user specifying information and the address of said notification unit.

17. A video distribution method for a video distribution system connected to a communication network for distributing an image in response to a request, comprising the steps of:
accumulating a video signal in at least one monitor area in an image accumulation and distribution unit through said network,
wherein said video signal has attached thereto information unique to each image frame;
reading an image for each channel from said image accumulation and distribution unit through said network;
detecting an image change indicating an abnormality in associated monitor area from said image read out, producing alarm information containing the change occurrence time and a still image of said change occurrence time, and transmitting said alarm information to associated information terminal through said network;

displaying said alarm information on said associated information terminal;

acquiring the image in a predetermined time range related to said change occurrence time from said image accumulation and distribution unit or a data converter for image browsing in response to the selection of the image reproduction by a user of said associated information terminal; and displaying said image in said predetermined time range in a display unit of said associated information terminal, wherein, for an information terminal having a browser program interlocked with an email function, said notification unit sends unique information on an image change to the information terminal via email, and in response, said data converter for image browsing sends a reduced image corresponding to said unique information received from said information terminal to said information terminal and, for an information terminal having no browser program interlocked with the email function, said notification unit, in response to connection from said information terminal, sends unique information accumulated in the notification unit to said information terminal so as to connect said data converter to said information terminal in response to selection of the unique information by the information terminal, wherein said data converter distributes an image in a form displayable on said information terminal to said information terminal.

* * * * *